(12) United States Patent
Habibi-Naini

(10) Patent No.: US 7,291,008 B2
(45) Date of Patent: Nov. 6, 2007

(54) NEEDLE SHUT-OFF NOZZLE FOR AN INJECTION MOLDING MACHINE

(75) Inventor: Sasan Habibi-Naini, Rikon (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 11/408,148

(22) Filed: Apr. 20, 2006

(65) Prior Publication Data

US 2006/0251757 A1  Nov. 9, 2006

(30) Foreign Application Priority Data

Apr. 25, 2005 (EP) ................... 05405313

(51) Int. Cl.
  *B29C 45/20* (2006.01)
(52) U.S. Cl. ...................... 425/566; 425/573
(58) Field of Classification Search ............... 425/562, 425/564, 566, 573
  See application file for complete search history.

(56) References Cited

U.S. PATENT DOCUMENTS

| 3,902,665 A | * | 9/1975 | Hendry .................. 239/119 |
| 4,942,006 A | | 7/1990 | Loren ..................... 264/50 |
| 5,101,858 A | | 4/1992 | Klotz ..................... 137/605 |

| 2004/0091569 A1 | * | 5/2004 | Babin ..................... 425/572 |
| 2005/0003032 A1 | * | 1/2005 | Sugihara et al. ............ 425/4 R |

FOREIGN PATENT DOCUMENTS

| DE | 19853021 | | 7/2000 |
| DE | 19853021 A1 | * | 7/2000 |
| JP | 7323444 | | 12/1995 |
| JP | 07323444 A | * | 12/1995 |
| JP | 2001158029 | | 12/2001 |

OTHER PUBLICATIONS

Michaeli W. et al: "Spritzgiessen Mikrozellulaerer Schaeume Vergleich Der Verfahrenskonzepte", Aug. 2002.

* cited by examiner

*Primary Examiner*—Robert B. Davis
*Assistant Examiner*—Marissa W Chaet
(74) *Attorney, Agent, or Firm*—Francis C. Hand; Carella, Byrne, Bain, et al.

(57) ABSTRACT

The needle shut-off nozzle is provided in a housing for delivering polymer melt to an injection molding machine or an injection molding tool. The nozzle is mounted in a channel of the housing for a flow of the polymer melt, a nozzle at an outlet of the channel, a shut-off needle guided in the channel for shutting off the nozzle, and a needle drive for moving the shut-off needle. The needle drive includes a drive cylinder inside said channel, a piston connected to the shut-off needle and a pneumatic circuit for delivering a compressed gas at a pressure greater than 50 bar to the drive cylinder to drive the piston.

14 Claims, 1 Drawing Sheet

NEEDLE SHUT-OFF NOZZLE FOR AN INJECTION MOLDING MACHINE

Figure 1:
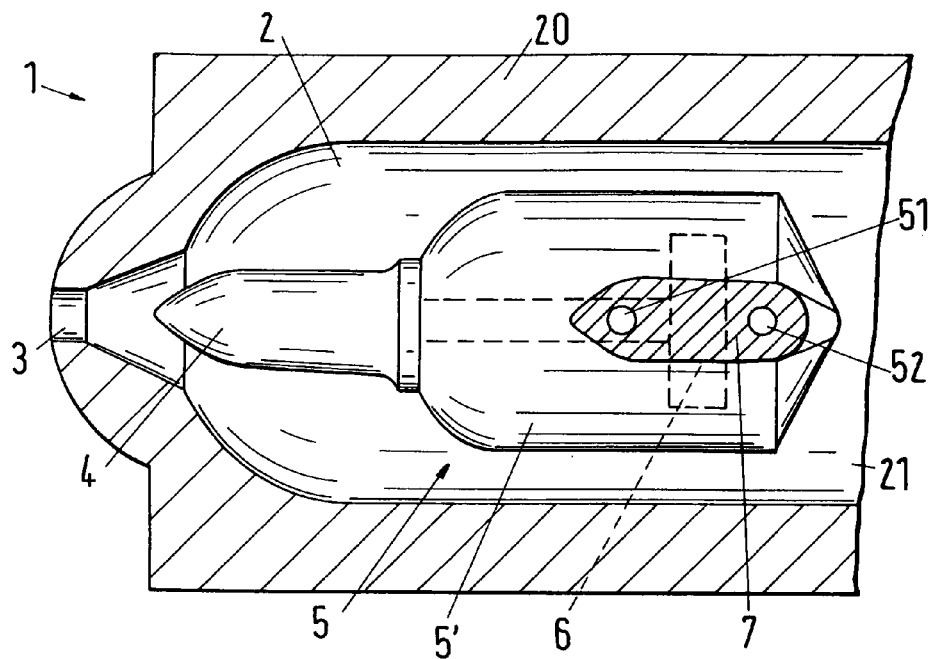

This invention relates to a needle shut-off nozzle for an injection molding machine. More particularly, this invention relates to an injection molding machine employing a needle shut-off valve.

A conference report (International Annual Conference Injection Moulding 2004, VDI Verlag Düsseldorf 2004, pages 357-367) offers a brief summary of newer developments in connection with a hot runner technology which is used in the manufacture of injection moulded plastic parts.

In complicated injection molding tools, runner systems are used that each have a plurality of closely arranged channels. During operation, melted plastic is led through the runner system in a controlled manner into diverse zones of an injection moulding tool, into so-called "mould cavities" or into regions of the mould cavities. In addition, heaters are used at the melt-conducting channels to ensure that the melt contained in the channels does not solidify.

Advantageously, no impression of the runner parts or sprues form on the injection moulded part when using the hot runner technology which, as a rule, makes injection moulding possible with a higher cadence and renders a removal of these runner part impressions superfluous. Typically, each hot channel contains a nozzle at an opening or upstream of the opening and the flow of melt through the nozzle can be influenced and, in particular, interrupted by a valve needle. A hot channel nozzle of this kind is advantageously designed as a needle shut-off nozzle, the needle of which can be actively opened or released and also actively closed by a pressurised fluid.

The shut-off needle of a needle shut-off nozzle can be brought into an open or closed position pneumatically using a gaseous working medium or hydraulically using oil as a working medium and by using a drive cylinder, which for example operates a lever acting on the shut-off needle. A known shut-off member used in injection moulding machines is arranged at the head of a plastification aggregate and is a needle shut-off nozzle with a pneumatic needle drive. However, such a needle drive requires a lot of space. Also, the high compression of the gaseous working medium is a further disadvantage.

Less space is required for a hydraulic needle shut-off nozzle, such as is already realised in hot channel nozzles. In this arrangement, the compressibility of the working medium, namely of the hydraulic oil, is advantageously relatively small. However, in such hydraulic needle drives, the space requirements are also still too high in particular cases. This is the case, for example, when a polymer melt is to be fed into a moulding tool in a cascade-like manner using a hot channel system. In a hot channel system of this kind, it is desirable or even necessary that the infeed points of the hot channels are arranged close together.

Accordingly, it is the object of the invention to produce an apparatus with a needle shut-off nozzle in which a needle drive is more favourably designed with regard to space requirements than in the known pneumatic solution.

It is another object of the invention to provide a needle shut-off nozzle for an injection moulding apparatus that can be operated pneumatically in an efficient manner.

Briefly, the invention provides a needle shut-off nozzle assembly for an injection moulding machine that has a channel for a flow of polymer melt, a nozzle at an outlet of the channel, a shut-off needle guided in the channel for shutting off the nozzle and a needle drive for moving the shut-off needle. In accordance with the invention, the needle drive includes a drive cylinder inside the channel, a piston connected to the shut off needle and reciprocally mounted in the cylinder, and a pneumatic circuit for delivering a compressed gas at a pressure greater than 50 bar to the drive cylinder to drive the piston therein.

The compressed gas is one having a relatively low compressibility and can therefore be regarded as a hydraulic working medium. For an ideal gas, the compressibility is equal to $2 \times 10^{-7}$ $Pa^{-1}$ at 50 bar (compressibility $x=(\partial \rho/\partial p)T$ $\rho^{-1}=p^{-1}$). Nitrogen ($N_2$) is approximately an ideal gas. Other gases include carbon dioxide, air, an inert gas, water vapor and mixtures of any of these gases and nitrogen. Also, the compressed gas may be in a supercritical thermodynamic condition.

The needle shut-off nozzle is particularly useful in an apparatus having a plastification cylinder for conducting a flowable polymer melt and at least one melt channel in communication with the cylinder to receive a flow of polymer melt therefrom. In this apparatus, the needle shut-off nozzle is disposed in an outlet end of the melt channel to regulate a flow of polymer melt therethrough. In addition, an impregnation unit may be disposed between the plastification cylinder and the needle shut-off nozzle for impregnating the polymer melt with a physical expanding agent. In this embodiment, a reservoir for the compressed gas may be connected to both the impregnation unit and the pneumatic circuit to deliver the gas to each.

Where the apparatus includes a moulding tool in communication with a plurality of melt channels to receive polymer melt from multiple infeed points of the melt channels the adjacent infeed points are arranged at spacings which are smaller than twice the diameter of the drive cylinder of a respective nozzle diameter.

Figure 2:
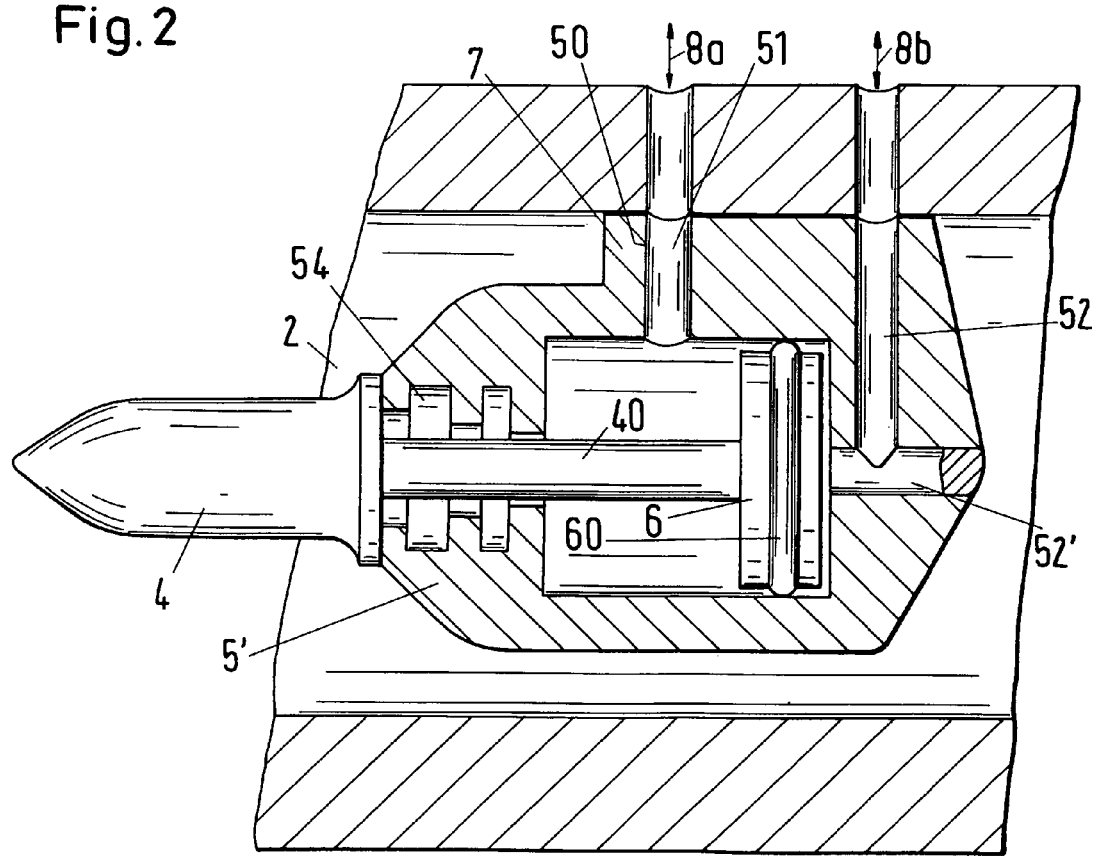

These and other objects and advantages of the invention will become more apparent from the following detailed description taken in conjunction with the accompanying drawings wherein:

FIG. 1 illustrates a part cross-sectional view of a needle shut-off nozzle assembly within a melt channel in accordance with the invention; and FIG. 2 a part cross-sectional view of the needle shut-off nozzle of FIG. 1 and a pneumatic circuit for delivering compressed gas to the nozzle.

Referring to FIGS. 1 and 2, the needle shut-off nozzle 1 is particularly constructed for use with an injection moulding machine (not shown). The nozzle 1 includes a housing that defines a channel 2 in which, in an operating state, a polymer melt flows to a nozzle 3 at an exit end of the channel 2.

The nozzle 1 also has a shut-off needle 4 in the melt channel 2 for stopping the flow of melt by closing the nozzle 3 and a needle drive 5 with a torpedo shaped drive cylinder 5' and a piston 6 for reciprocating the shut-off needle 4 within the channel 2. As illustrated, a forward movement of the needle 4 into seating engagement with the housing closes the nozzle 3 and shuts off the flow of polymer from the channel 2. A rearward movement of the needle 4 re-opens the nozzle 3 to the flow of polymer.

The piston 6 carries a heat resistant annular seal 60 that sealingly engages an interior wall of the drive cylinder 5' and is connected to the shut-off needle 4 via a shaft 40. The piston 6 extends through a labyrinth seal, as illustrated, at the downstream end of the drive cylinder 5'.

The needle drive 5 includes a pneumatic circuit for delivering a fluid working medium, i.e. a compressed gas, to the drive cylinder 5' to drive the piston 6. The pressure of the compressed gas is greater than 50 bar and may can adopt values of up to 600 bar. This pneumatic circuit includes a pair of passages 51,52 that extend through a web 7 of the needle drive 5 and that communicate via radial bores in the housing with a reservoir (not shown) of compressed gas. The double arrows 8a and 8b indicate the transport of the compressed gas. In addition, one passage 51 communicates with the interior of the drive cylinder 5' on the downstream side of the piston 6 while the other passage 52 communicates with a central longitudinal bore 52' of the drive cylinder 5' on the opposite side of the piston 6, with this bore being closed at the outer end by a suitable plug or the like.

The web 7 of the needle drive 5 is fastened via a durable connection 50 to the channel wall 20 (or housing 20) and supports the needle drive centrally of the channel 2. Advantageously, the drive cylinder 5' which is of torpedo shape is connected to the channel wall 20 via more than one web 7.

In operation, the channel wall 20 is held by a heating device (not shown) at a temperature at which the polymer melt has a good flowability. A region 21 of the channel 2 formed behind the drive cylinder 5' is formed in a not shown form as a connection to a plastification aggregate (or a plastification cylinder).

During operation, some of the working medium may escape out of the drive cylinder 5' through the seal 54. This can result in a low degree of contamination of the polymer melt. Accordingly, a material is thus advantageously selected for the working medium which takes into account this possible contamination so that any leakage does not create a problem by effecting the quality of an injection moulded component which is to be manufactured. At least the two following cases can be distinguished with respect to this unproblematic influence on the quality of the moulded component:

a) The gas taken up by the polymer melt remains dissolved in the injection moulded component and is able to escape by vaporization after completion of the injection moulded component, in particular by diffusion.

b) The gas taken up by the polymer melt acts as a physical expanding agent which leads to the formation of bubbles, alone or together with a further expanding agent.

A compressed gas that can satisfy these requirements include carbon dioxide ($CO_2$), nitrogen ($N_2$), air, a noble gas, water vapor or a mixture of at least two of these gases (or vapor). The compressed gas can be in a thermodynamic state (in the working cylinder) which is supercritical.

The seal 54 is designed as a three-stage wiper ring. Melt which adheres to the surface of the shaft 40 between the extended needle and the cylinder 5' is prevented by this wiper ring from entering into the cylinder space of the drive cylinder 5' on a return stroke of the shaft 40.

A solution is fundamentally possible using hydraulics. However, the known solution is still insufficient with regard to the object of reducing the space occupied by the means to impregnate a molten polymer with an expanding agent.

The needle shut-off nozzle 1 can form a shut-off valve at the head of a plastification cylinder and/or can be arranged in a heating channel.

A plant can include a plurality of melt channels wherein each channel contains a needle shut-off nozzle 1.

The pneumatic circuit may also include a metering station for metering the flow of compressed gas into the drive cylinder 5'.

The apparatus employing the needle shut-off nozzle 1 may have an impregnation unit between a plastification cylinder for conducting a flow of a polymer melt and the needle shut-off nozzle for impregnating the polymer melt with a physical expanding agent. In this embodiment, the reservoir or an accumulator for the compressed gas may be connected to the impregnation unit and the pneumatic circuit for the delivery of the compressed gas to both the impregnation unit as an expanding agent for impregnation and the pneumatic circuit for use as a fluid working medium for the needle shut-off nozzles.

In an advantageous plant, the needle shut-off nozzle 1 can be arranged downstream of a plastification cylinder to form the shut-off member at the head of the plastification cylinder.

In a further plant in accordance with the invention, the polymer melt is fed into a mould in cascade like manner through a plurality of hot channels with each having a shut-off nozzle 1 at the outlet end, i.e. at an infeed point of the mould. In this arrangement, the infeed points or gates can be more closely arranged than in known plants. Adjacent infeed points can be arranged at spacings which, in relation to the diameters of the drive cylinder 5', are respectively smaller than five times the largest of these cylinder 5' diameters or individual ones of these spacings are smaller than twice the cylinder 5' diameter. In special cases, the spacings adopt minimal values which are minimised to the extent this is possible as a result of a constructional design of the hot channels.

What is claimed is:

1. A needle shut-off nozzle assembly for an injection moulding machine comprising
    a channel for a flow of polymer melt,
    a nozzle at an outlet of said channel,
    a shut-off needle guided in said channel for shutting off said nozzle, and
    a needle drive for moving said shut-off needle, said needle drive including a drive cylinder inside said channel, a piston connected to said shut-off needle and reciprocally mounted in said cylinder, and a pneumatic circuit for delivering a compressed gas at a pressure greater than 50 bar to said drive cylinder to drive said piston therein.

2. A needle shut-off nozzle assembly as set forth in claim 1 wherein said compressed gas is characterized as an expanding agent for the polymer melt.

3. A needle shut-off nozzle assembly as set forth in claim 1 wherein said compressed gas is at least one of carbon dioxide, nitrogen, air, an inert gas, water vapor and a mixture thereof.

4. A needle shut-off nozzle assembly as set forth in claim 1 wherein said compressed gas is in a supercritical thermodynamic condition.

5. A needle shut-off nozzle assembly as set forth in claim 1 wherein said pneumatic circuit includes a metering station for metering the flow of compressed gas into said cylinder.

6. An apparatus comprising
    a plastification cylinder for conducting a flowable polymer melt,
    at least one melt channel in communication with said cylinder to receive a flow of polymer melt therefrom, and
    a needle shut-off nozzle assembly disposed in an outlet end of said melt channel to regulate a flow of polymer melt therethrough, said nozzle including a channel for a flow of polymer melt, a nozzle at an outlet of said channel, a shut-off needle guided in said channel for shutting off said nozzle, and a needle drive for moving said shut-off needle, said needle drive including a drive cylinder inside said channel, a piston connected to said shut-off needle and reciprocally mounted in said cylinder, and a pneumatic circuit for delivering a compressed gas at a pressure greater than 50 bar to said drive cylinder to drive said piston therein.

7. An apparatus as set forth in claim 6 comprising a plurality of said melt channels in communication with said cylinder to receive a flow of polymer melt therefrom and a plurality of said needle shut-off nozzles, each said nozzle being disposed in a respective one of said melt channels.

8. An apparatus as set forth in claim 6 further comprising an impregnation unit between said plastification cylinder and said needle shut-off nozzle assembly for impregnating the polymer melt with a physical expanding agent.

9. An apparatus as set forth in claim 8 further comprising a reservoir for said compressed gas connected to said impregnation unit and said pneumatic circuit.

10. An apparatus as set forth in claim 6 further comprising a plurality of said melt channels in communication with said cylinder to receive a flow of polymer melt therefrom; a plurality of said needle shut-off nozzle assemblies, each said nozzle assembly being disposed in a respective one of said melt channels; and a moulding tool in communication with said melt channels to receive polymer melt from infeed points of said melt channels and wherein adjacent infeed points are arranged at spacings which are smaller than twice the diameter of said drive cylinder of a respective nozzle diameter.

11. A needle shut-off nozzle assembly for an injection moulding machine comprising a housing having a wall defining a channel for a flow of polymer melt;

a nozzle at an outlet of said channel;

a drive cylinder disposed centrally of said channel;

at least one web connecting said drive cylinder to said housing wall;

a piston reciprocally mounted in said drive cylinder;

a pneumatic circuit for delivering a compressed gas at a pressure greater than 50 bar to said drive cylinder to drive said piston therein; and a shut-off needle within said channel and connected to said piston for selectively shutting off and opening said nozzle to the flow of polymer melt in said channel in response to reciprocation of said piston.

12. A needle shut-off nozzle assembly as set forth in claim 11 wherein said pneumatic circuit includes a pair of passages in said web communicating with said drive cylinder on opposite sides of said piston.

13. A needle shut-off nozzle assembly as set forth in claim 11 further comprising a labyrinth seal at one end of said drive cylinder and a shaft connecting said piston to and with said needle and passing through said labyrinth seal.

14. A needle shut-off nozzle assembly as set forth in claim 11 wherein said drive cylinder is torpedo shaped.

* * * * *